United States Patent [19]

Fujioka

[11] Patent Number: 4,882,561
[45] Date of Patent: * Nov. 21, 1989

[54] ELECTRIC NOISE ABSORBER

[75] Inventor: Akio Fujioka, Ichikawa, Japan

[73] Assignee: Kitagawa Industries Co., Ltd., Japan

[*] Notice: The portion of the term of this patent subsequent to Apr. 25, 2006 has been disclaimed.

[21] Appl. No.: 187,515

[22] Filed: Apr. 28, 1988

[30] Foreign Application Priority Data

Jul. 13, 1987 [JP] Japan ............................ 62-108144[U]

[51] Int. Cl.⁴ ...................... H01F 17/06; H01F 27/02; H01F 17/26
[52] U.S. Cl. ....................................... 336/65; 324/127; 333/12; 336/175; 336/210; 336/212
[58] Field of Search ........................... 174/92; 324/127; 333/81 R, 12, 182, 243, 183; 336/174, 175, 176, 229, 212, 210, 233, 90, 92, 67, 65, 100

[56] References Cited

U.S. PATENT DOCUMENTS

| | | | |
|---|---|---|---|
| 3,018,455 | 1/1962 | Brandon, Jr. et al. | 336/100 |
| 3,229,030 | 1/1966 | Baermann | 174/117 F |
| 3,241,198 | 3/1966 | Baermann | 335/303 |
| 3,374,434 | 3/1968 | Perry | 336/67 |
| 3,462,715 | 8/1969 | Schor | 333/183 |
| 3,514,731 | 5/1970 | Drake | 335/285 |
| 3,516,026 | 6/1970 | Curran et al. | 333/12 |
| 3,711,632 | 1/1973 | Ghirardi | 174/92 X |
| 3,838,213 | 9/1974 | Georgopulos et al. | 174/92 X |
| 3,846,725 | 11/1974 | Mears, Jr. | 336/208 X |
| 3,943,412 | 3/1976 | Wickstrom | 336/67 X |
| 4,336,806 | 6/1982 | Eldridge, Jr. | 128/348 |

FOREIGN PATENT DOCUMENTS

| | | | |
|---|---|---|---|
| 624455 | 1/1936 | Fed. Rep. of Germany | 336/176 |
| 129316 | 10/1979 | Japan | 336/176 |
| 60-16404 | 1/1985 | Japan | |
| 61-38714 | 3/1986 | Japan | |
| 61-76626 | 5/1986 | Japan | |
| 61-97899 | 6/1986 | Japan | |
| 61-116021 | 7/1986 | Japan | |
| 62-14770 | 4/1987 | Japan | 336/175 |
| 2179502 | 3/1987 | United Kingdom | |

Primary Examiner—Thomas J. Kozma
Attorney, Agent, or Firm—Oliff & Berridge

[57] ABSTRACT

An electric noise absorber for clamping to a cord or cable of an electronic device comprises a retaining case composed of two box-shaped case pieces. Each case contains a magnetic body having a recess at the upper part thereof for receiving the cord. It is possible to easily and securely attach and detach the electric noise absorber to the cord or cable by simply closing and opening the case pieces.

15 Claims, 11 Drawing Sheets

ELECTRIC NOISE ABSORBER

BACKGROUND OF THE INVENTION

This invention relates to an electric noise absorber for absorbing electric noise which is generated within an electronic device or which enters from the outside into the device through a line cord or cable.

As a method for absorbing such noise, it is well-known that ferrite can be attached to encircle a line cord or cable. In this method, two pieces of half ring-shaped ferrite are simply attached around the line cord by an adhesive tape. It is troublesome to attach the separate pieces to the line cord or cable and to detach the adhesive tape. Upon attachment of the noise absorber, the pieces are apt to easily become detached from the line cord due to an uncovered state of the ferrite and it cannot be used for an extended period of time. In addition, vibration may cause a displacement of the noise absorber from an initially-attached position to the line cord. When the ferrite is conductive, short-circuit and the like may cause within the electronic device.

To solve the above problem, a holding case for holding the one piece ferrite has been proposed and developed. Such a holding case can not open or close; it is necessary to attach the holding case before wiring. In the holding case, a case portion for holding the ferrite and a mounting portion for mounting the holding case to the electronic device are integrally constructed. In general, the electric noise is generated after completion of assembly of the electronic device. Once the wiring is rearranged, the noise absorber need to be detached and then again attached to the wire.

Furthermore, positions and numbers of the absorber must be beforehand determined on the spot. The positions and numbers of the absorbers must be determined beforehand. Therefore, the experienced technique is required. It is not easy to change the numbers of the absorbers attached and positions thereof to the cord after the electronic absorber has been assembled. In the prior art as described, the mounting portion is screwed or bolted on the electronic device. As an operation for mounting the holding case on the electronic device and an operation for setting the ferrite in the holding case clearly separated and further the mounting portion of the case projects sidewardly, a flat mounting area is required on the holding case. Also, the mounting portion projects outwardly, a large space is thus required on the holding case, and a small-sized holding case cannot be attained. Since the respective portions are integrally constructed, once the holding case is fixed on a position of the electronic device, it is not easy to rearrange it to another position.

SUMMARY OF THE INVENTION

It is an object of this invention to provide an electric noise absorber in which a magnetic body can be held securely to a line cord or cable for an extended period of time.

It is an object of this invention to provide an electric noise absorber that, whenever required, can easily be attached to and detached from the line cord or cable.

It is an object of this invention to provide an electric noise absorber which can effectively absorb electric noise and prevent the noise generation and noise inflow to the line cord or cable from outside.

It is an object of this invention to provide an electric noise absorber which provides an effective noise absorbing efficiency.

It is an object of this invention to provide an electric noise absorber which can be small sized.

It is an object of this invention to provide an electric noise absorber which can prevent a short circuit and the like within an electronic device.

It is an object of this invention to provide an electric noise absorber which can prevent the ferrite bodies from falling off the cable or cord or being hurt by striking against something.

These objects and other related objects are realized by an electric noise absorber of the invention which includes: a magnetic body (3a,3b,64a,64b) abutably divided into at least two portions and configured to receive an electric conductor; a retaining case (1,61) including two cases (4,5,62,63) for taking an opened state, and a closed state, and holding said magnetic body (3a,3b,64a,64b) and said electric conductor in said locked state; and a case fixing stand (2,65) for engaging and disengaging with said retaining case (1,61).

BRIEF DESCRIPTION OF THE DRAWINGS

This invention is illustrated diagrammatically in the following drawings wherein.

DETAILED DESCRIPTION OF PREFERRED EMBODIMENTS

A first embodiment of this invention will be described with reference to FIGS. 1–4.

Figure 1:
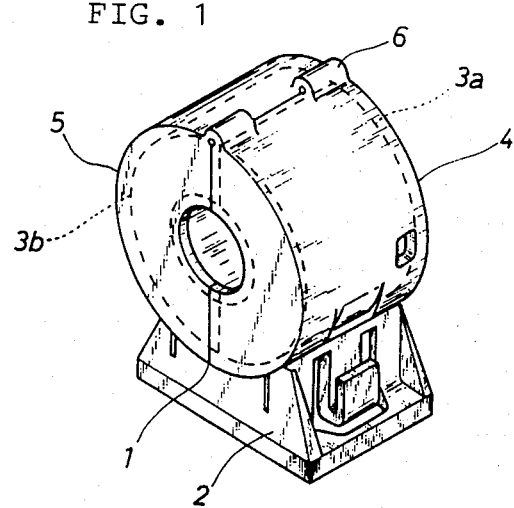
FIG. 1 is a perspective view illustrating an electric noise absorber of a first embodiment.
Figure 2:
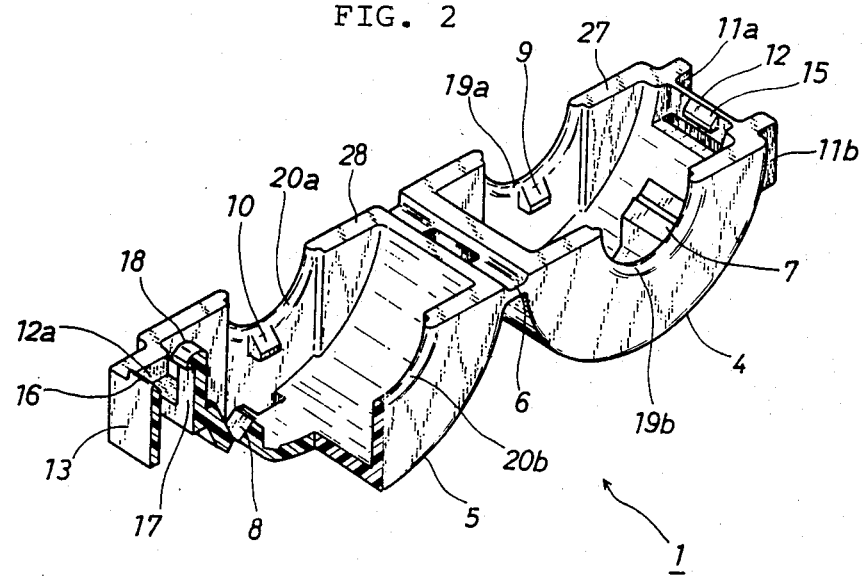
FIG. 2 is a perspective view, in partly cross-section, of the retaining case of the first embodiment shown in FIG. 1 Q in an opened state.
Figure 3:
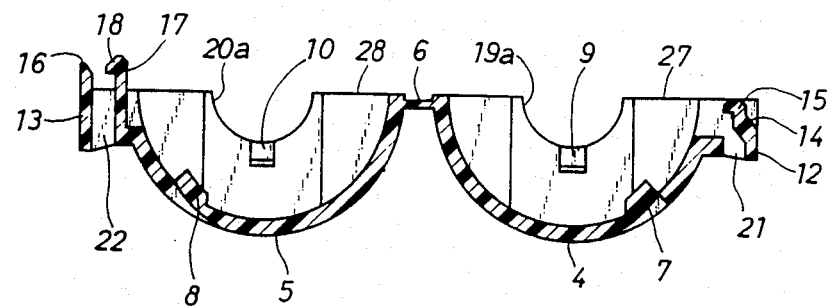
FIG. 3 is a sectional view of the retaining case of the first embodiment taken along a line III—III of FIG. 4.
Figure 4:
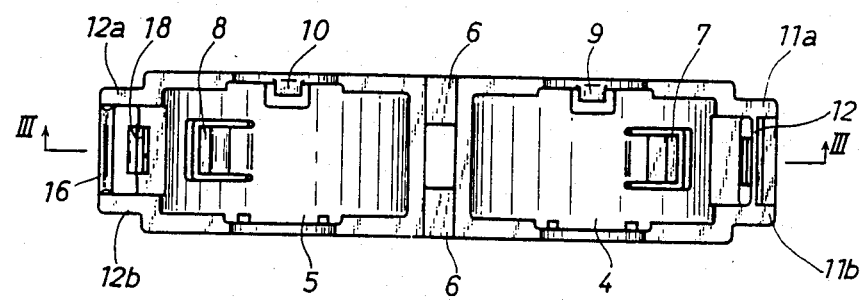
FIG. 4 is a top plan view of the retaining case of the first embodiment in an opened state.

Referring to FIG. 1, an electric noise absorber comprises a retaining case 1, a case fixing stand 2, a pair of semi-ring-shaped ferrite bodies 3a and 3b. The retaining case 1 includes two case pieces 4 and 5 which are connected by means of a hinge 6. The case pieces 4 and 5 are cylindrical-shaped with one open surface and are configured to securely contain the ferrite bodies 3a and 3b. Referring to FIGS. 2–4, a pair of resilient members 7 and 8 are provided in the inner bottom surfaces of the case pieces 4 and 5, and is extending upwardly so as to push the outer surfaces of the ferrite bodies 3a and 3b. A pair of engagement pawls 9 and 10 are provided on the side walls 27 and 28 of the case pieces 4 and 5, respectively, so as to downwardly push side notches 50a and 50b of the ferrite bodies 3a and 3b.

Two pairs of parallel plates 11a and 11b, 12a and 12b are extending radially and outwardly from outer edge surfaces opposed to the edges having the hinge 6. Each pair of such parallel plates are connected by means of connecting plates 12 and 13, respectively.

Referring to FIG. 3, the connecting plate 12 of the case piece 4 has a stepped portion 14 on the outer surface thereof. A protrusion 15 is inwardly extending from the stepped portion 14 of the connecting plate 12 so as to close and lock the case pieces 4 and 5. A protrusion 16 is provided on an upper portion of the connecting plate 13 to engage with the protrusion 15 in the locked state of the case pieces 4 and 5. A plate 17 with a hook 18 juxtaposes to the connecting plate 13, and it is extending from the edge portion of the inner bottom surface of the case piece 5. Two pairs of semi-circular notches 19a and 19b, 20a and 20b are formed in both side walls 27 and 28 of the case pieces 4 and 5 respectively.

Figure 5:
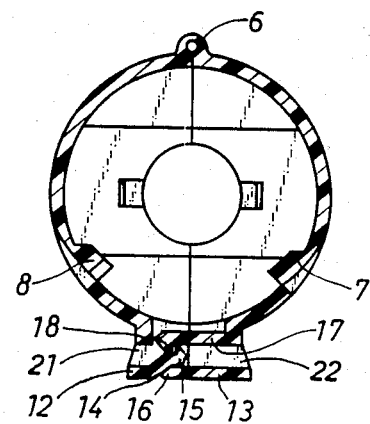
FIG. 5 is a front sectional view of the retaining case of FIG. 1 in a closed and locked state.
Figure 6:
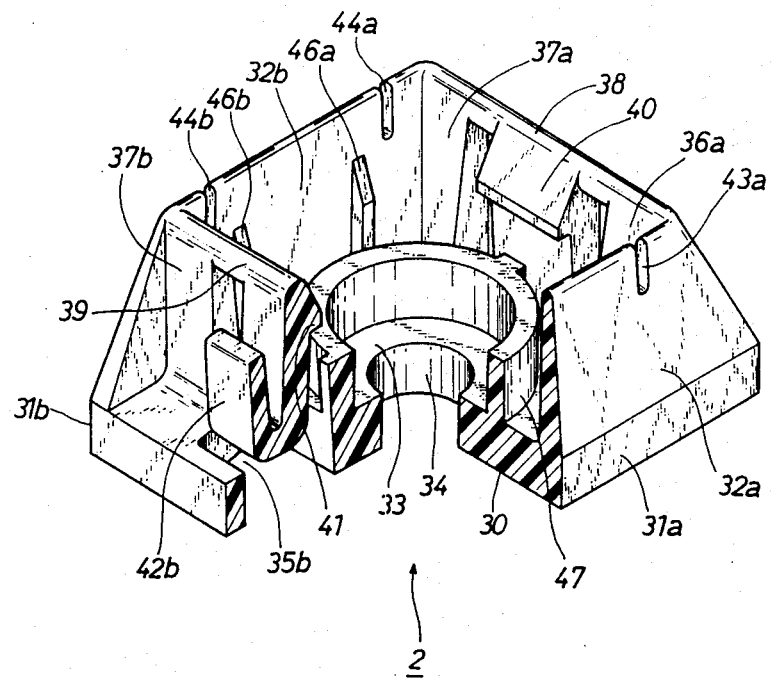
FIG. 6 is a perspective view, in partly cross-section, of a case fixing stand of the first embodiment.
Figure 7:
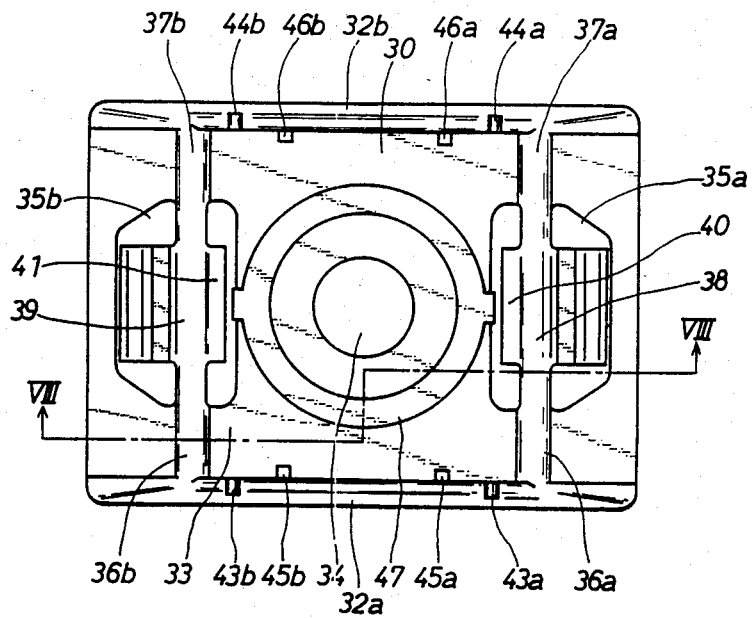
FIG. 7 is a top plan view of the case fixing stand of the first embodiment.
Figure 8:
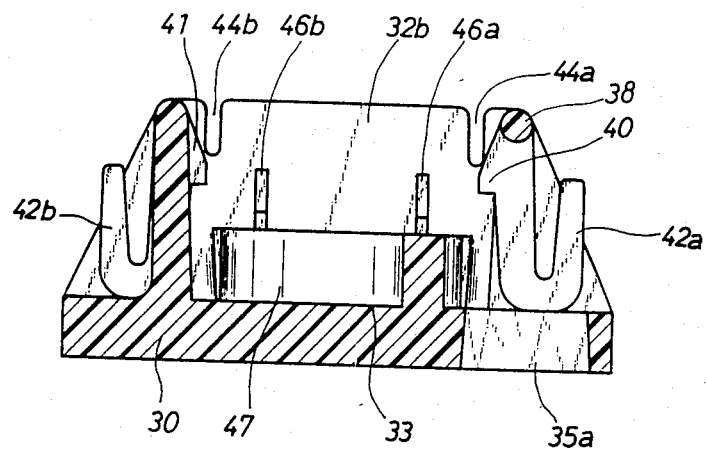
FIG. 8 is a sectional view of the case fixing stand taken along line VIII—VIII of FIG. 7.
Figure 9:
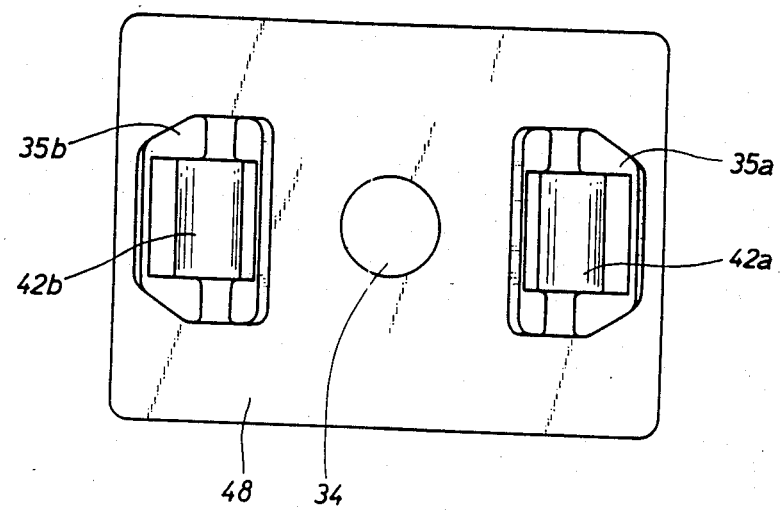
FIG. 9 is a bottom view of the case fixing stand of the first embodiment.

Referring to FIG. 5, upon closure of the case pieces 4 and 5, the plate 15 engages with the hook 18, and the protrusion 16 securely abuts the stepped portion 14. With respect to the fixing of the two case pieces 4 and 5, parallel plates 11a, 11b, 12a and 12b, and the connecting plates 12 and 13 are configured to form through holes 21 and 22 for receiving the case fixing stand 2. The retaining case 1 is of an integral construction, and is made of a synthetic resin. Each protrusion, hook, plate and the like has an appropriate resiliency.

Referring to FIGS. 6–9, the case fixing stand 2 is hereinafter described. Supporting plates 36a, 36b, 37a and 37b are provided on the upper side portions of side walls 32a and 32b. The supporting plates 36a and 36b are connected to the supporting plates 37a and 37b by means of connecting rods 38 and 39, respectively. Two protrusions 40 and 41 extend inwardly from a central portion of the connecting rods 38 and 39, respectively, and fit into through holes 21 and 22 of the retaining case 1. A pair of two resilient J-shaped levers 42a and 42b extend downwardly from a base portion of the two protrusions 40 and 41, respectively, and bend upwardly at the upper portions of the through holes 35a and 35b. Two pairs of U-shaped recesses 43a and 43b, 44a and 44b are downwardly provided in the side walls 32a and 32b in the vicinity of the corner, respectively. Two pairs of protrusions 45a and 45b, 46a and 46b extend upwardly from the bottom wall 30, and are provided more inside position than the U-shaped recesses 43a, 43b, 44a and 44b. A cylindrical wall 47 extends upwardly from a bottom surface 33 co-axially encircling a screw hole 34 for receiving a screw. The case fixing stand 2 is integrally constructed by a synthetic resin, and the each pawl, protrusion, wall and the like has appropriate resiliency.

Figure 10:
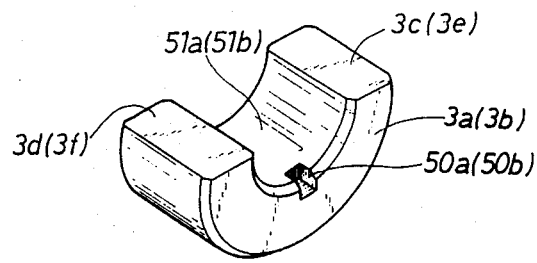
FIG. 10 is a perspective view of one of a pair of ferrite bodies of the first embodiment.

Referring to FIG. 10, the ferrite bodies 3a and 3b have abutment surface 3c, 3d, 3e, 3f, respectively. They also have a recesses (51a,51b) to receive a portion of a conductor 51. Notches 50a and 50b are provided at the side of the ferrite bodies 3a and 3b, and engages with the engagement pawls 9 and 10 of the case pieces 4 and 5, respectively.

Figure 11:
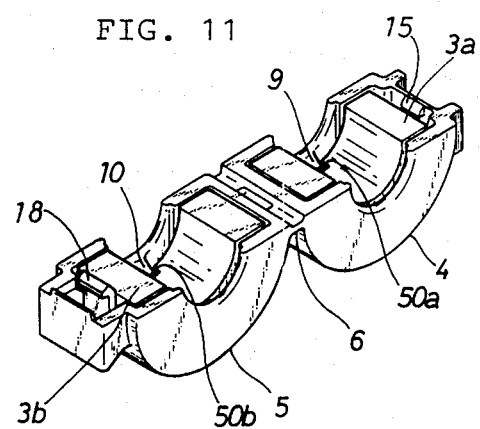
FIG. 11 is a perspective view of the retaining case and the pair of the ferrite bodies which is fitted into the retaining case of the first embodiment in an opened state.

Referring to FIG. 11, an assembly of the retaining case 1 and the case fixing stand 2 are hereinafter described. First, the ferrite bodies 3a and 3b are fitted into case pieces 4 and 5 to engage the engagement pawl 9 and 10 with the notches 50a and 50b, respectively.

Figure 12:
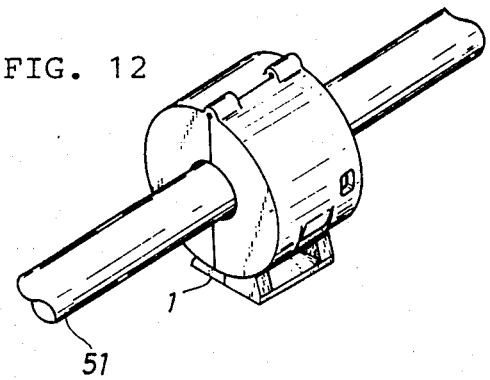
FIG. 12 is a perspective view of the electric noise absorber of the first embodiment in use.

Referring to FIG. 12, ferrite bodies 3a and 3b contained in the retaining case 1 hold the peripheral surface of the conductor 51 of the electronic device. First, the case pieces 4 and 5 are pivoted about the hinge 6, and then the protrusion 15 of the case piece 4 is fitted into the hook 18 of the case piece 5 to secure the closed and locked state of the retaining case 1. The resilient members 7 and 8 provided in the case pieces 4 and 5 push inwardly the outer surfaces of the ferrite bodies 3a and 3b so that the ferrite bodies 3a and 3b firmly abut each other.

Figure 13:
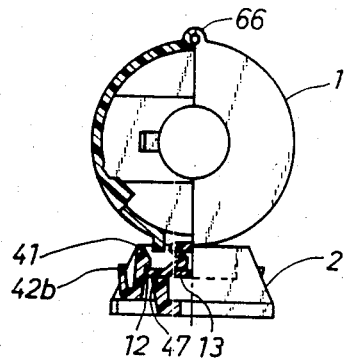
FIG. 13 is a front elevational view, in partly cross-section, of the electric noise absorber in which the retaining case is mounted on the case fixing base.
Figure 14:
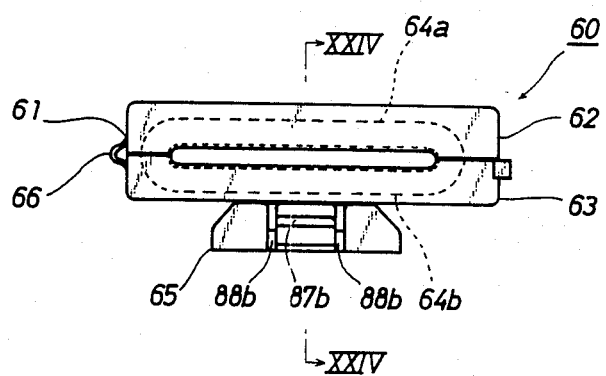
FIG. 14 is a front view of the electric noise absorber of a second embodiment.

As shown in FIG. 13, the locked retaining case 1 is fixed on the case fixing stand 2. The protrusions 40 and 41 are fitted into the through holes 21 and 22, and securely engage with the connecting plates 12 and 13 to prevent the unlocking of the retaining case 1. The connecting plate 12 of the retaining case 1 abuts the protrusion 16 so that the connecting plates 12 and 13 are in alignment. The aligned plates 12 and 13 are mounted on the upper surfaces of the cylindrical wall 47 of the case fixing stand 2 so that the case fixing stand 2 stably supports the retaining case 1.

The J-shaped levers 42a and 42b are pushed outwardly so that the protrusions 40 and 41 and the connecting plates 12 and 13 are disengaged. Therefore, the retaining case 1 is dismounted from the case fixing stand 2. A screw is fitted into the screw hole 34, and it is screwed into a portion of the electronic device to mount the case fixing stand 2. Alternatively, a bottom surface of the case fixing stand 2 adheres to the portion of the electronic device.

As described above, the ferrite bodies 3a and 3b are snugly retained in the retaining case 1. The case pieces 4 and 5 can be opened and closed, and the retaining case 1 is detachably mounted on the case fixing stand 2 so that it is attached to the electronic device in any orientation despite completion of the assembly and the wiring. Furthermore, the case fixing stand 2 is positioned just below the retaining case 1 so that a mounting space of the electric noise absorber to the electronic device is reduced. By applying an appropriate number of the electric noise absorbers 1 containing the ferrite bodies 3a and 3b to the conductor 51, the electric noise flowing into the conduit 51 is absorbed by the ferrite body and thus generation of noise is prevented. Noise is measured at various positions along the conduit by a noise measuring device to determine the correct position where noise is absorbed most efficiently, and the noise absorber is then located at the correct position. It is preferable that the most appropriate number of the noise absorbers to be used are experimentally determined in response to measurement for the noise absorbing efficiency. The ferrite bodies 3a and 3b absorb the electric noise that is generated outside or enters the electronic device through the conductor. Regarding the magnetic body, either hard or soft ferrite can be used. Further, a plastic or rubber magnet which is made by mixing magnetic powder of ferrite with plastic or rubber can also be used.

The pair of ring-shaped ferrite bodies 3a and 3b can be respectively wound with an enamel wire. The ferrite bodies thus easily wound are housed in retaining case pieces. When the cases are closed, coils are formed therein. That can increase operation efficiency.

Regarding the retaining case 1, it is made of a synthetic resin, alternatively another material such as an insulator (e.g. paper) can be employed.

An electric noise absorber 60 of a second embodiment is hereinafter described with reference to FIGS. 14 through 26.

Figure 15:
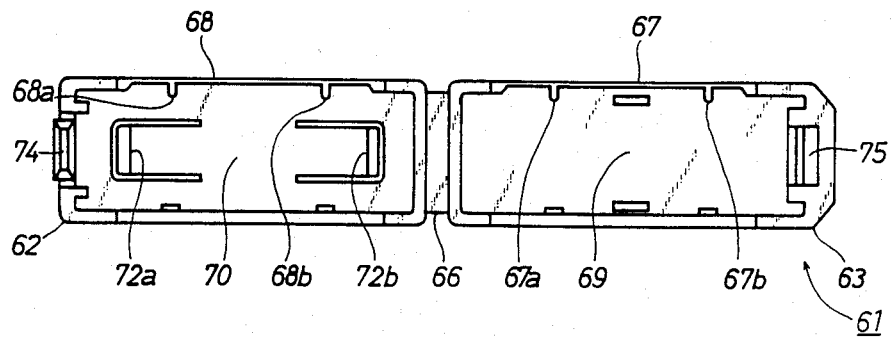
FIG. 15 is a top plan view of the retaining case of the second embodiment in an opened state.
Figure 16:
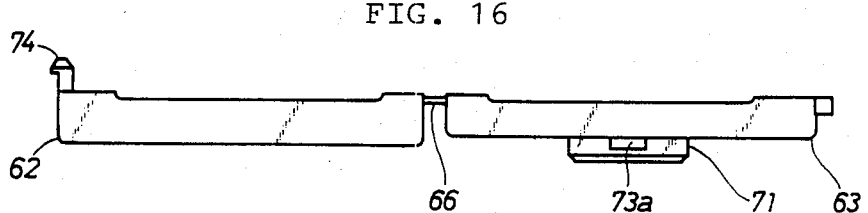
FIG. 16 is a front view of the retaining case of the second embodiment in the opened state.
Figure 17:
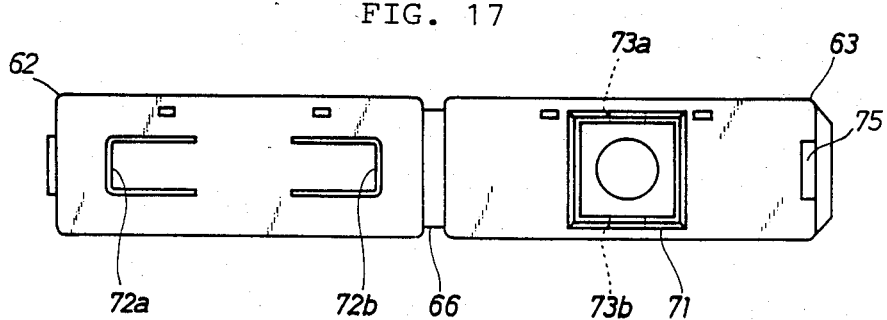
FIG. 17 is a bottom view of the retaining case of the second embodiment in the opened state.

Referring to FIGS. 15-17, the retaining case 61 includes two case pieces 62 and 63 which are box-shaped with one open surface, and are configured to securely contain flat ferrite bodies 64a and 64b, and they are connected by means of a hinge 66. The retaining case 61 is mounted on and engages with a case fixing stand 65. Two pairs of engagement pawls 67a and 67b, 68a and 68b are provided on inner surfaces of the side walls 67 and 68 of the case pieces 62 and 63, and engage with and sidewardly push side notches 91a and 91b of the ferrite bodies 64a and 64b shown in FIG. 21. A pair of resilient members 72a and 72b are provided on an inner surface of bottom wall 70 of the case piece 62, and they are extending upwardly so as to push the outer surface of the ferrite bodies 64a.

Referring to FIGS. 16-17, a rectangular wall 71 extends downwardly and centrally from an outer surface of a bottom wall 69 of the case piece 63. On opposing sides of the rectangular wall 71 are provided rectangular notches 73a and 73b which are parallel to the side wall 67. A hook 74 is upwardly extending from edge outer surface of the case piece 62 opposite to the hinge 66. A rectangular through hole 75 is provided in the edge portion of the case piece 63 opposite to the hinge 66, into which the hook 74 is fitted.

Figure 18:
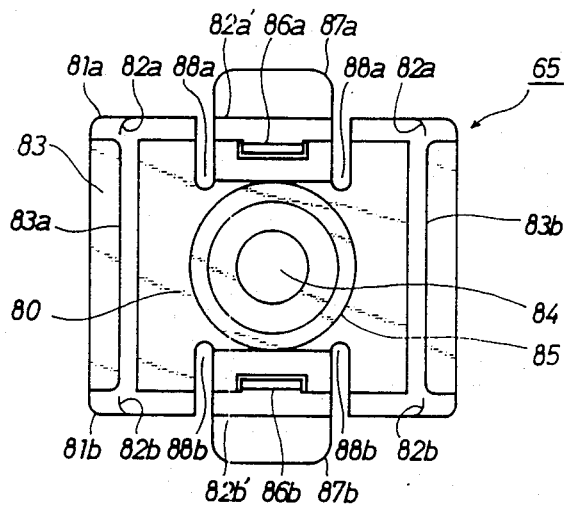
FIG. 18 is a top plan view of the case fixing stand of the second embodiment.
Figure 19:
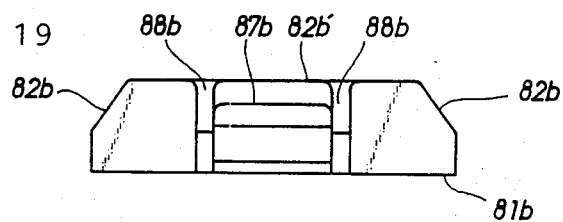
FIG. 19 is a front view of the case fixing stand of the second embodiment.
Figure 20:
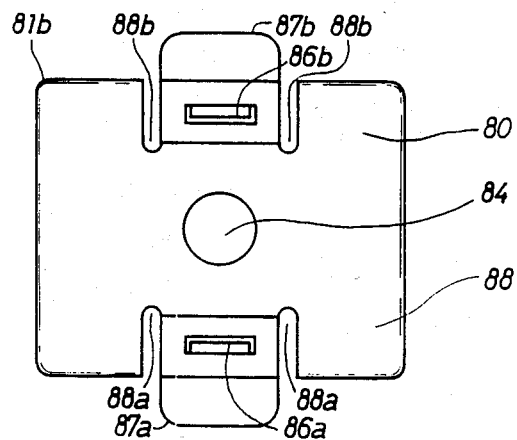
FIG. 20 is a bottom view of the case fixing stand of the second embodiment.

Referring to FIGS. 18-20, the case fixing stand 65 is hereinafter described. Trapezoid side walls 82a and 82b are provided on the transverse sides 81a and 81b of a bottom wall 80 of the case fixing stand 65. The bottom wall 80 has a upper surface 83. The side walls 82a and 82b are connected by means of connecting plates 83a and 83b.

A screw hole 84 is provided in the center of the bottom wall 80. A cylindrical wall 85 extends from a peripheral surface of the screw hole 84 for receiving a screw. Protrusions 86a and 86b extend inwardly from central portions 82a' and 82b' of the side walls 82a and 82b. The protrusions 86a and 86b engage with the notches 73a and 73b of the rectangular wall 71 of the case piece 63. Operating ribs 87a and 87b for disengaging protrusions 86a and 86b which has been engaging therewith extend outwardly from the outside of the central portions 82a' and 82b'. U-shaped recesses 88a and 88b are provided in the vicinity of the respective sides of the operating ribs 87a and 87b, and they extend parallel to the connecting plates 83a and 83b. The case fixing stand 65 is integrally constructed by a synthetic resin, and the each pawl, protrusion, wall and the like has appropriate resiliency.

Figure 21:
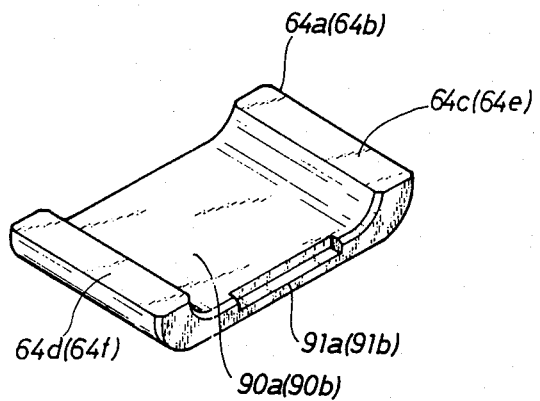
FIG. 21 is a perspective view of one of a pair of flat-shaped ferrite bodies of the second embodiment.
Figure 22:
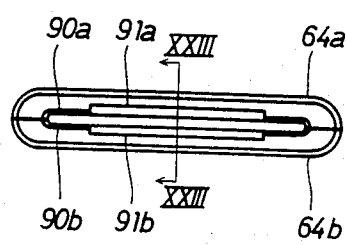
FIG. 22 is a front view of the pair of the ferrite bodies of the second embodiment.
Figure 23:
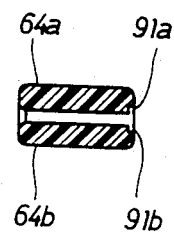
FIG. 23 is a sectional view of the pair of the ferrite taken along line XXIII—XXIII of FIG. 22.

Referring to FIG. 21, the ferrite bodies 64a and 64b have abutment surface 64c, 64d, 64e, 64f, respectively. They also have U-shaped recesses 90a and 90b to receive a portion of a flat cable 92. The notches 91a and 91b are provided at the side of the ferrite bodies 64a and 64b, and engage with the engagement pawls 67a and 67b, 68a and 68b of the case pieces 62 and 63, respectively. The U-shaped flat recesses 90a and 90b are configured to receive the flat wires, for example, flat cable.

Figure 24:
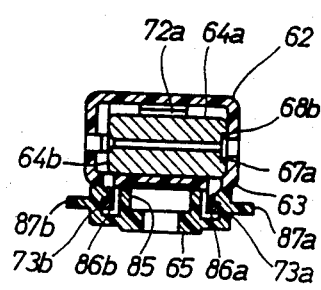
FIG. 24 is a sectional view of the retaining case and the pair of ferrite bodies which is fitted into the retaining case of the second embodiment, taken along a line XXIV—XXIV of FIG. 14.

Referring to FIG. 24, an assembly of the retaining case 61 and the case fixing stand 65 is hereinafter described. First, the ferrite bodies 64a and 64b are fitted into the case pieces 62 and 63 and they engage the engagement pawls 67a and 67b, 68a and 68b engage with the notches 91a and 91b of ferrite bodies 64a and 64b, respectively.

Figure 25:
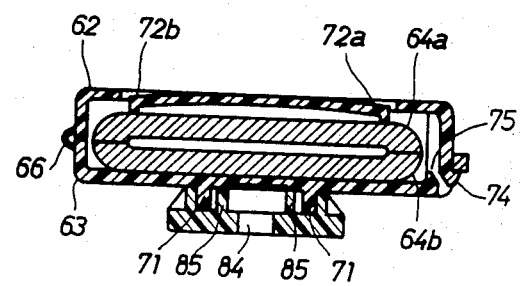
FIG. 25 is a front sectional view of the retaining case and the ferrite body which is fitted into the retaining case of the second embodiment; and, FIG. 26 is a perspective view of the electric noise absorber of the second embodiment in use.

Referring to FIG. 25, when the case pieces 62 and 63 are juxtaposed to close the retaining case 61, and the hook 74 of the case piece 62 is then fitted into the through hole 75 of the case piece 63 to thereby secure the closed and locked state of the retaining case 61. The hook 74 is manually manipulated toward hinge 66 so that the retaining case 61 is easily opened.

Figure 26:
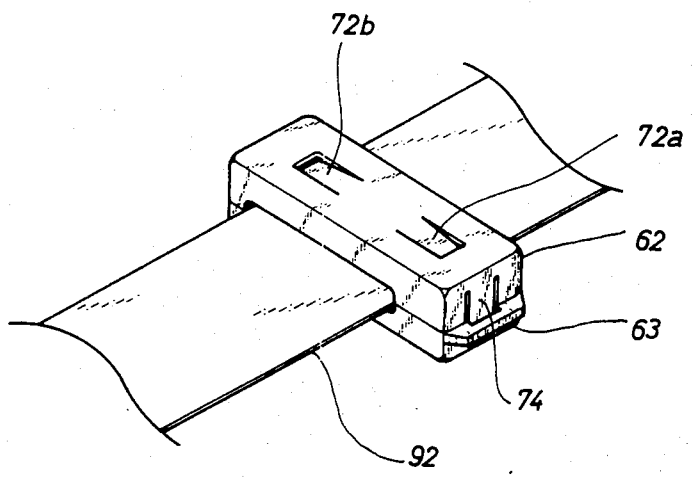

Referring to FIG. 26, the ferrite bodies 64a and 64b contained in the retaining case 61 hold the peripheral surface of the flat cable 92 of the electronic device. The resilient members 72a and 72b are provided in the case pieces 62 so as to push inwardly the outer surfaces of the ferrite bodies 64a and 64b so that the ferrite bodies firmly abut each other, and encircle the flat cable 92. The closed magnetic circuit is thus formed in the ferrite bodies.

Next, the locked retaining case 61 is mounted on the case fixing stand 65. The protrusions 86a and 86b of the case fixing stand 65 are fitted into the notches 73a and 73b of the retaining case 61, respectively, to prevent demounting of the retaining case 61 from demounting the case fixing stand 65. The lower surface of the retaining case 61 abuts the upper surface of the cylindrical wall 85 so that the case fixing stand 65 stably support the retaining case 61.

The effects of the second embodiment is similar to the first embodiment.

Obviously many modifications and variations of the present invention are possible in the light of the above teachings. It is therefore to be understood that within the scope of the appended claims in the invention may be practiced otherwise than as specifically described.

What is claimed is:

1. An electric noise absorber comprising:
    a magnetic abutably divided into at least two portions, said magnetic body configured to receive an electric conductor;
    a retaining case including two case pieces, said case pieces being movable with respect to each other between an open state and a closed state, said retaining case including means for holding said magnetic body about and adjacent to an electric conductor when in said closed state to absorb electronic noise;
    a case fixing stand; and
    a latching mechanism detachably holding said fixing stand to said retaining case, said mechanism having resilient pawl-type protrusions and means being detachably engaged by said protrusions.

2. An electric noise absorber as defined in claim 1, wherein said two case pieces are hingedly connected at one end thereof by means of a hinge.

3. An electric noise absorber as defined in claim 1, wherein said magnetic body is provided with a notch which engages with an engagement pawl which is provided on an inner side wall of said retaining case for said magnetic body within said retaining case.

4. An electric noise absorber as defined in claim 2, wherein engaging means is provided on another respective end portion of each of said cases opposite to said hinged end.

5. An electric noise absorber as defined in claim 1, wherein said retaining case (1,61) is provided with a resilient member (7,8,72a,72b) on an inner surface thereof for pushing inwardly said magnetic body.

6. An electric noise absorber as defined in claim 1, wherein said case fixing stand includes a bottom wall (30,80) having an inner surface and an outer surface (48,88), side walls extending from said bottom wall.

7. An electric noise absorber as defined in claim 6, wherein a hole for receiving screw means to fix said case fixing stand to an electronic device is provided in a center of said bottom wall of case fixing stand.

8. An electric noise absorber as defined in claim 7, wherein said case fixing stand includes a cylindrical wall extending from said bottom wall and coaxially encircling said hole.

9. An electric noise absorber as defined in claim 1, wherein said case fixing stand includes U-shaped recesses and a protrusion.

10. An electric noise absorber as defined in claim 6, wherein said side walls of said case fixing stand are connected with supporting plates which are connected to each other by means of connecting rods said protrusions being 7000 in number and J-shaped levers for mounting and dismounting said pair of case pieces to each other, said protrusions and said J-shaped levers both extending from said connecting rod.

11. An electric noise absorber as defined in claim 1, wherein a rectangular wall is further provided at the bottom of said case piece for fixing said retaining case to said case fixing stand.

12. An electric noise absorber as defined in claim 1, wherein said magnetic body is in a flat-shaped configuration for holding an electric conductor in said closed state of said pair of case pieces.

13. An electric noise absorber as defined in claim 11, wherein said case fixing stand includes an opening rib which extends from said side walls.

14. An electric noise absorber as defined in claim 13, wherein said case fixing stand includes side walls, each of said protrusions extending from said side walls to engage with a means of said rectangular wall, said means including a hole.

15. An electric noise absorber as defined in claim 1, wherein said two portions of said magnetic body include abutment surfaces which contact each other when said case pieces are locked, and a recess for holding a portion of an electric conductor.

* * * * *

UNITED STATES PATENT AND TRADEMARK OFFICE
CERTIFICATE OF CORRECTION

PATENT NO. : 4,882,561

DATED : November 21, 1989

INVENTOR(S) : Akio Fujioka

It is certified that error appears in the above-identified patent and that said Letters Patent is hereby corrected as shown below:

Column 8, line 14 (Claim 10, line 5), delete "being 7000 in number" and insert --being two in number--.

Signed and Sealed this

Nineteenth Day of February, 1991

Attest:

HARRY F. MANBECK, JR.

*Attesting Officer*  *Commissioner of Patents and Trademarks*